United States Patent [19]
Lewis

[11] 3,916,400
[45] Oct. 28, 1975

[54] MALFUNCTION WARNING DEVICE FOR USE WITH ELECTRICAL METERS

[75] Inventor: John R. Lewis, North White Plains, N.Y.

[73] Assignee: Safe Flight Instrument Corporation, White Plains, N.Y.

[22] Filed: Apr. 26, 1974

[21] Appl. No.: 464,512

[52] U.S. Cl. ...... 340/253 B; 324/154 PB; 340/27 R; 340/266
[51] Int. Cl.² ......................................... G08B 21/00
[58] Field of Search ............ 340/181, 253 B, 253 C, 340/266; 73/432 A; 324/154 R, 154 PB

[56] References Cited
UNITED STATES PATENTS
2,946,007    7/1960    Knudsen ............................ 324/154
3,221,322    11/1965   Smith ................................. 340/316

*Primary Examiner*—Thomas B. Habecker
*Assistant Examiner*—James J. Groody
*Attorney, Agent, or Firm*—Edward A. Sokolski

[57] ABSTRACT

A mechanical actuator member operates to drive the pointer of an electrical meter off scale behind the shroud of the meter case when an electrical signal normally fed thereto is interrupted, this drive action generally being achieved by means of a spring. When the electrical signal which indicates normal operation is present, the drive member is driven by a motor or solenoid to a position away from the meter pointer out of its normal deflection path, so that it does not interfere with its operation. Thus, malfunctions indicated by interruption of power to the actuator device result in off scale deflection of the meter.

6 Claims, 7 Drawing Figures

U.S. Patent  Oct. 28, 1975  3,916,400
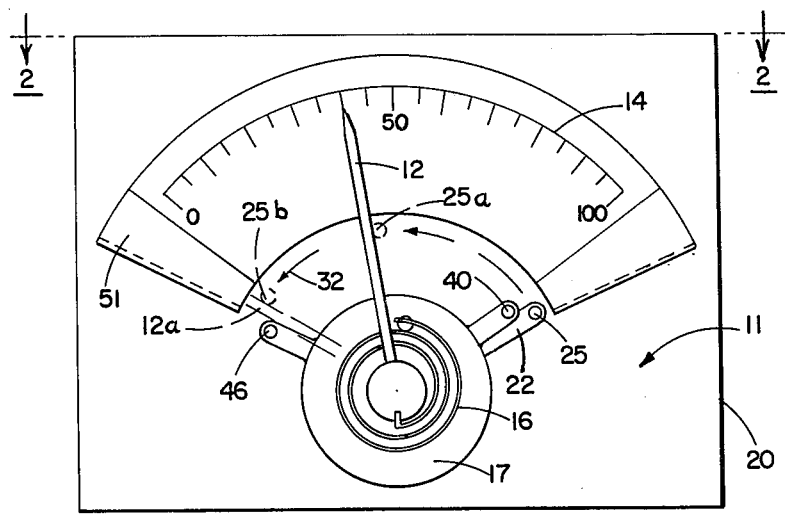
FIG. 1
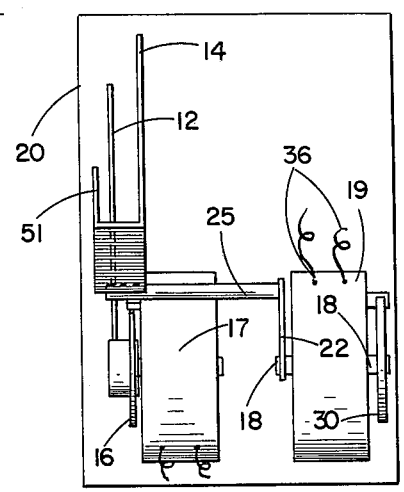
FIG. 3
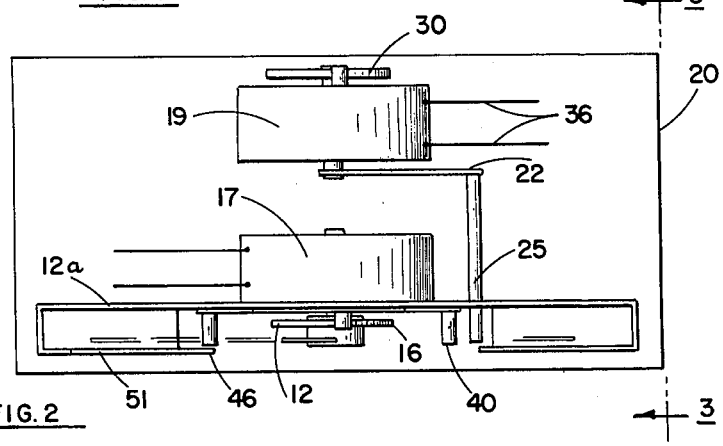
FIG. 2
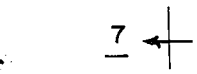
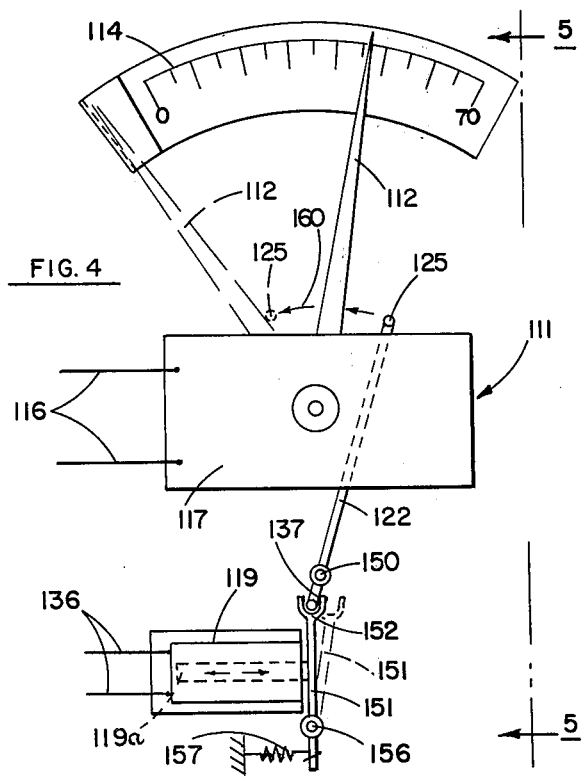
FIG. 4
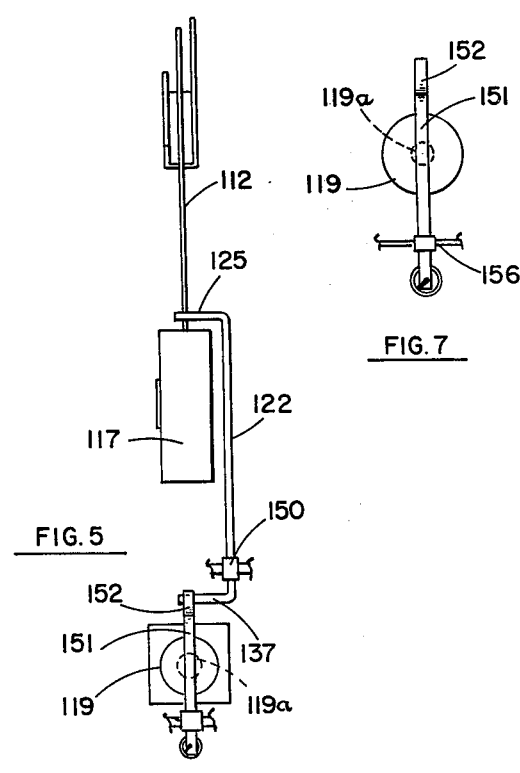
FIG. 5  FIG. 6  FIG. 7

MALFUNCTION WARNING DEVICE FOR USE WITH ELECTRICAL METERS

This invention relates to a device for providing a malfunction warning and more particularly, to an electrically operated device for driving the pointer of a needle off scale when a power interruption indicating malfunction occurs.

In the use of indicating devices such as electrical meters for monitoring the performance of aircraft instruments, it is highly desirable to alert the operator by some positive indication on the meter that a malfunction has occurred in the system in question. In the past, warning lights, flags and the like have been used for this purpose. It is believed, however, that a more positive warning can be achieved by causing the meter pointer to be driven off scale, out of view.

One way of achieving this in the prior art is to provide an electrical signal when a malfunction occurs, this signal being introduced as an electrical bias into the meter movement so as to drive the pointer to one side under the meter shroud. This approach has the disadvantage in that with a power failure, the electrical biasing signal cannot be generated so that the pointer will not be driven out of view as required. Another prior art approach is the use of a mechanical bias against which an electrical bias operates to hold the pointer in the zero position in the absence of an input signal, such that in the event of a power failure the mechanical bias will draw the pointer off scale. This approach however has a disadvantage in that it requires a very stable electrical bias supply if errors in meter indication are to be avoided. Further, this approach can only be used with equipment specially designed for its use and cannot be applied to certain types of indicating mechanisms.

The device of the present invention overcomes the shortcomings of the prior art in providing an actuator device which is kept out of the path of the meter pointer in response to an electrical signal indicating normal operation of the equipment. When this electrical signal disappears indicating a malfunction, a mechanical bias force, which may be provided by a spring, drives the actuator against the pointer to being the pointer to an off scale position where it is generally out of view. The device of the invention is not dependent on electrical systems and thus has none of the aforementioned disadvantages attendant thereto. Further, in the event of a power failure, the mechanical drive will still operate to bring the pointer to the concealed position. The device of the present invention further does not involve any modification of the existing meter movement in that it only involves mechanical actuation of the pointer thereof. Thus, it can be readily used with most existing meters without any significant modification thereto.

It is therefore an object of this invention to provide an improved device for indicating malfunction of equipment being monitored by an electrical meter.

It is a further object of this invention to provide a malfunction indicator device which can be readily incorporated into existing electrical meters.

It is still another object of this invention to provide a malfunction indicating device for use with electrical meters which is not dependent upon an electrical bias system and thus will function in the event of a power failure.

Other objects of this invention will become apparent as the description proceeds in connection with the accompanying drawings, of which:

FIG. 1 is an end elevation view of one embodiment of the invention;

FIG. 2 is a view taken along the plane indicated by 2—2 in FIG. 1;

FIG. 3 is a view taken along the plane indicated by 3—3 in FIG. 2;

FIG. 4 is a plan view of a second embodiment of the invention;

FIG. 5 is a view taken along the plane indicated by 5—5 in FIG. 4;

FIG. 6 is a cross-sectional view showing the solenoid actuator member of the embodiment of FIG. 4; and FIG. 7 is a view taken along the plane indicated by 7—7 in FIG. 6.

Briefly described, the device of the invention is as follows: An actuator member includes a pusher bar which is supported for pivotal motion through a path within the area swept by the pointer of an electrical meter. The pusher bar is retained in a position outside of this path in response to drive means which moves to a predetermined position to effect this end result in response to an electrical signal. This drive means in one embodiment includes a motor and in another, a solenoid. With the electrical signal present, this signal indicating normal operation of the equipment, the actuator is retained in the aforementioned out-of-the-way position. In the event that this electrical signal is interrupted, the actuator (pusher bar) is mechanically driven by means of a spring member or the like, against the meter pointer so as to drive this pointer off scale to a concealed position behind a shroud.

Referring now to FIGS. 1–3, one embodiment of the invention is illustrated. Electrical meter 11 has a pointer 12 which is spring urged to the left (towards zero) on meter scale 14 by spring 16. Needle 12 is driven in a sweeping movement in a clockwise direction by electrical meter movement 17 in response to electrical signals fed thereto. Mounted in the meter casing 20 to the rear of meter movement 17 is motor 19. Motor 19 has a rotatable drive shaft 18 which has an arm 22 fixedly attached thereto. Extending from arm 22 parallel to shaft 18 is pusher bar 25. Shaft 18 is spring biased in a counterclockwise direction (such as to drive pusher bar 25 in the direction indicated by arrow 32 in FIG. 1) by coil spring 30.

An electrical signal indicative of normal operation of the equipment being monitored is fed to motor 19 by means of leads 36. Such a signal which is often termed a "validity" signal is provided in most aircraft equipment.

With a validity signal being fed to motor 19, shaft 18, arm 22 and pusher bar 25 are maintained in a fully clockwise position as shown in FIG. 1. With the pusher bar in this position it cannot interfere with the full range of movement of pointer 12, the pointer's fully clockwise position being established by meter stop 40. In the event, however, that the validity signal being fed to motor 19 disappears, spring 30 will drive shaft 18, arm 22 and pusher bar 25 counterclockwise so that the pusher bar drives against pointer 12 (as indicated by 25a in FIG. 1) pushing the pointer to a final resting position against meter stop bar 46 (the pusher bar being indicated by 25b and the pointer by 12a in FIG. 1). In this position, the pointer is out of the view of the operator, behind the meter shroud 51.

In this manner, the pusher bar 25 and its operating mechanism is kept fully out of the way of the meter movement and the pointer so that it cannot interfere with the operation thereof during normal equipment operation. However, when a malfunction occurs, and the validity signal disappears, the pusher bar operates to drive the pointer off scale out of the operator'view to provide an immediate positive indication that a malfunction has occurred.

Referring now to FIGS. 4–7, a second embodiment of the invention is illustrated. Electrical meter 111 has a "pancake" type movement with pointer 112 being driven in response to electrical signals fed to meter movement 117 on wires 116. The validity signal is fed on wires 136 to solenoid 119. Arm 122 is pivotally supported by support member 150. One end portion of arm 122 is bent over at right angles to form pusher bar 125. The opposite end of arm 122 is similarly bent over at right angles to form a finger 137 which is engaged by the forked end portion 152 of solenoid clapper arm 151. When the validity signal is present on lines 136, the solenoid is energized and the clapper is held in the position shown in FIG. 4. Under such conditions, as can be seen, arm 122 is held in the far right-hand position out of the normal excursion path of pointer 112 so as not to interfere with the normal operation of the meter. Clapper 151 is pivotally supported by support member 156 and is resiliently urged away from the solenoid magnet 119a by spring 157. When the validity signal disappears, spring 157 draws clapper 151 to the position indicated in dotted outline, thereby causing arm 122 and its pusher bar portion 125 to be driven in the direction indicated by arrow 160. Under such conditions, the pusher bar drives pointer 112 off scale out of view of the operator to the position indicated in dotted outline. Thus, the second embodiment operates in the same general fashion as the first to remove the pointer from view when the validity signal disappears. Solenoid 119 must be totally shielded to minimize magnetic flux leakage which might adversely affect the operation of the meter.

While the device of the invention has been described and illustrated in detail, it is to be clearly understood that this is by way of illustration and example only and is not to be taken by way of limitation, the spirit and scope of this invention being limited only by the terms of the following claims.

I claim:

1. In combination with a meter, said meter having an indicator scale, a shrouded face portion covering an off scale portion of the indicator scale from view, and a pointer mounted for sweeping movement through a path relative to said scale to indicate various values thereon, a device for driving said pointer to a position adjacent said off scale portion to signal abnormal operation of equipment with which the meter is utilized comprising:

pusher bar mounted for movement through a path included in the path swept by the pointer, means for driving said pusher bar means to a first poisition out of said pointer path comprising electrically driven motor means, means for feeding to said motor means an electrical validity signal which is other than the meter drive signal and is indicative of normal operation of the equipment, means for coupling said motor means to said pusher bar means, said motor means when energized operating to retain said pusher bar means in said first position, and means for driving said pusher bar means into engagement with said pointer to a second position whereat the pointer is adjacent said off scale portion hidden from view behind said shrouded face portion.

2. The device of claim 1 wherein said means for driving said pusher bar means to the second position comprises a spring for driving the pusher bar means to said second position when the electrical signal indicating normal equipment operation disappears.

3. The device of claim 2 wherein said motor means comprises an electrical motor having a rotatable drive shaft.

4. The device of claim 3 wherein said coupling means comprises an arm connected to the motor drive shaft and extending substantially perpendicularly therefrom, said pusher bar means being connected to said arm extending in a direction substantially parallel to the motor drive arm.

5. The device of claim 2 wherein said motor means comprises a solenoid having a magnet and a pivotally supported clapper arm, said clapper arm being urged away from the magnet by said spring and towards said magnet when the electrical signal is fed to the solenoid, said clapper arm driving the coupling means.

6. The device of claim 5 wherein the coupling means comprises an arm having the opposite ends thereof bent over at substantially right angles to the central portion thereof, said clapper arm having a forked portion at one end thereof which engages one of the bent-over ends of the arm, the other of the bent-over ends of the arm comprising the pusher bar means, the central portion of the arm being pivotally supported.

* * * * *